(12) United States Patent  (10) Patent No.: US 6,689,963 B2
Brook  (45) Date of Patent: Feb. 10, 2004

(54) POULTRY CONVEYOR WHICH SPLITS INTO TWO DIFFERENT WEIGHING CONVEYORS FOR ENHANCED ACCURACY

(75) Inventor: Richard Morley Brook, West Yorkshire (GB)

(73) Assignee: Autosystems, Ltd., Trige (DK)

( * ) Notice: Subject to any disclaimer, the term of this patent is extended or adjusted under 35 U.S.C. 154(b) by 83 days.

(21) Appl. No.: 09/910,842

(22) Filed: Jul. 24, 2001

(65) Prior Publication Data
US 2002/0020568 A1 Feb. 21, 2002

Related U.S. Application Data (63) Continuation-in-part of application No. 09/269,730, filed as application No. PCT/GB97/02682 on Oct. 7, 1997, now abandoned.

(30) Foreign Application Priority Data

Oct. 8, 1996 (GB) ............................................ 09620983
Apr. 23, 1997 (GB) ............................................ 09708206

(51) Int. Cl.$^7$ ............................................. G01G 19/00
(52) U.S. Cl. ........................................ 177/145; 198/436
(58) Field of Search ................................. 177/119, 120, 177/121, 122, 123, 145, 25.18; 198/436

(56) References Cited

U.S. PATENT DOCUMENTS

| 4,096,950 A | 6/1978 | Brook ......................... 177/145 |
| 4,282,633 A | 8/1981 | Graham et al. ............. 198/436 |
| 4,300,644 A | 11/1981 | Meyn .......................... 177/145 |
| 4,488,635 A | 12/1984 | Linville ....................... 177/145 |
| 4,577,708 A | 3/1986 | Brook ......................... 177/145 |
| 4,688,654 A | 8/1987 | Mosher et al. ........... 177/25.18 |
| 4,709,770 A | 12/1987 | Kohashi et al. ............. 177/185 |
| 4,995,467 A | 2/1991 | Niemann ................. 177/25.18 |
| 5,004,093 A | 4/1991 | Blezard ...................... 198/430 |
| RE34,839 E | 1/1995 | Tolson ........................ 177/145 |
| 5,635,679 A | 6/1997 | Kohashi et al. ............. 177/145 |
| 5,856,637 A | 1/1999 | Vande Berg ............... 177/145 |
| 6,107,579 A | 8/2000 | Kinnemann ................. 177/145 |

FOREIGN PATENT DOCUMENTS

| EP | 0 501 208 A1 | 9/1992 |
| GB | 2 125 174 A | 2/1984 |
| WO | 98/05444 | 6/1989 |

*Primary Examiner*—Randy Gibson
(74) *Attorney, Agent, or Firm*—Arent Fox Kintner Plotkin & Kahn (57) ABSTRACT

An apparatus for processing articles moving in succession along a path includes a conveyor device, a splitter device and a weighing device. The conveyor device is arranged to convey a succession of individual articles from and along a single upstream path to and along a first split downstream path and a second split downstream path. The splitter device splits the succession of articles onto the first and second split downstream paths. Also, the splitter device directs alternate ones of the succession articles being conveyed on the single upstream path onto the respective first and second split downstream paths. The weighing device weighs each article while the articles are conveyed along the first and second split downstream paths.

20 Claims, 7 Drawing Sheets

POULTRY CONVEYOR WHICH SPLITS INTO TWO DIFFERENT WEIGHING CONVEYORS FOR ENHANCED ACCURACY

This is a Continuation-in-Part of application Ser. No. 09/269,730 filed Apr. 2, 1999 which is a 371 of PCT/GB97/02682 Apr. 2, 1999 now abn. The disclosure of the prior application is hereby incorporated by reference herein in its entirety.

The invention relates to an apparatus and method for processing articles moving in succession along a path, particularly, but not exclusively poultry carcasses.

Many forms of apparatus are known for processing poultry carcasses. The carcasses are usually conveyed by hanging them from shackles attached to a continuous conveyor.

The carcasses usually have to be weighed but there are many problems associated with weighing and the problems become more severe as processing rates increase.

For example, if the carcasses are arranged too closely together, then one carcass may touch another while being weighed, which will give an inaccurate result.

Various forms of apparatus have been developed to reduce the problems and examples of known systems are disclosed in our earlier U.K. Patents numbers 1 551 701 and 2 146 131.

We have now concluded that a more radical solution to the problem is required with modern processing apparatus where even higher processing rates are required.

We have also made further developments with a view to coping with problems such as might be caused by damaged, misaligned, and/or distorted poultry carcass carrying shackles.

The invention provides apparatus for processing articles moving in succession along a path, the apparatus comprising conveyor means arranged to convey a succession of articles along the path, means to split the succession of articles into at least two streams, and means to weigh each article while the articles are split into the two streams.

Splitting the articles into two or more streams not only allows more time for weighing each article, even when the articles are moving at relatively high speed, but it also minimises the risk that one poultry carcass will interfere with an adjacent one.

Preferably the succession is split using at least one transfer means.

The transfer means may transfer articles from a first part of the conveyor means to a second part of the same conveyor means.

Alternatively, the transfer means may transfer articles from a first conveyor means to a second conveyor means.

Where two separate conveyor means are used, the pitch of the articles i.e. the spacing between adjacent articles may be different on the second conveyor means, compared to the first conveyor means, provided the ratio of the line speeds of the conveyor means is the same as the ratio of the spacing between adjacent article carriers.

The weighing can conveniently be carried out on the transfer means.

The transfer means may comprise a mechanism operable to release an article from a first article carrier, swing the article into a weighing position, and then swing the article into another position in which it is placed on a second article carrier.

The article carriers may comprise poultry carcass carrying shackles.

Preferably, the conveyor means extends around a bend and articles are transferred from the conveyor means on the bend.

This has the advantage that delivering and receiving article carriers move away from each other immediately after the transfer point, and there is therefore less likelihood of accidental entanglement.

A corner wheel may be used to provide the bend.

The two streams are preferably provided by removing articles from two or more points on the bend.

There may be one transfer wheel around which the conveyor means passes, and at least two weighing wheels.

There may be an intermediate wheel between the transfer wheel and each weighing wheel.

At least one control wheel may be arranged adjacent to at least one weighing wheel to control the articles as they are replaced on the conveyor means.

Control means may be provided in the nip between a transfer wheel and a weighing wheel.

The control means may be arranged to prevent an article e.g. a poultry carcass, which is being transferred, from being pulled away from its carrier by either of the adjacent articles. With poultry carcasses, for example, the wings of adjacent birds can be interlocked.

The control means may be arranged to stabilise the article being transferred, and/or lock the article into the receiving carrier.

The invention includes a method of processing articles moving in succession along a path, comprising conveying the articles in succession along the path, splitting the succession of articles into at least two streams, and weighing each article while the articles are split into the two streams.

By way of example, specific embodiments of the invention will now be described, with reference to the accompanying drawings, in which:

FIG. 8.

Figure 1:
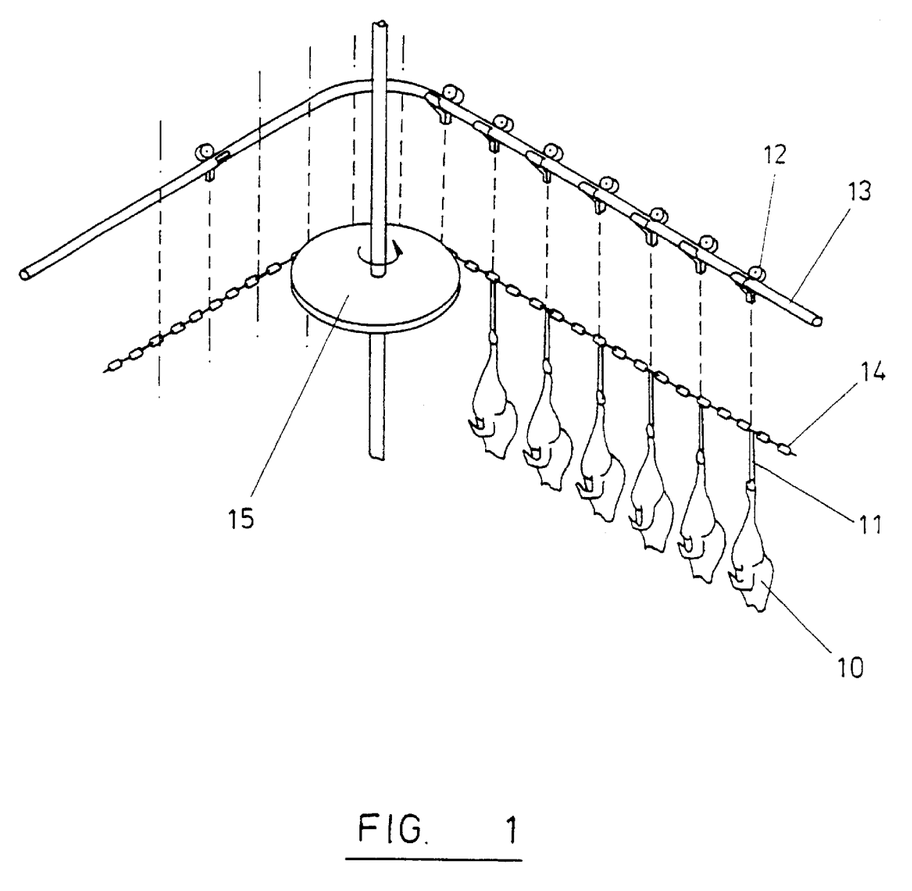
FIG. 1 is a perspective view showing the general type of poultry processing apparatus with which the invention is concerned.

FIG. 1 shows the general type of poultry processing apparatus with which the invention is concerned. A plurality of poultry carcasses 10 are suspended from shackles 11 for conveying along a path through a poultry processing plant, so that the carcasses can be weighed, graded, and then sorted or processed according to weight and grade. The shackles 11 are suspended from trolleys 12 running along a rail 13. The shackles are moved by a continuous chain 14 and at points along the path the chain may pass around corner wheels such as 15.

In prior art arrangements, the carcasses 10 are weighed while still attached to the shackles 11, which has certain limitations.

Figure 2:
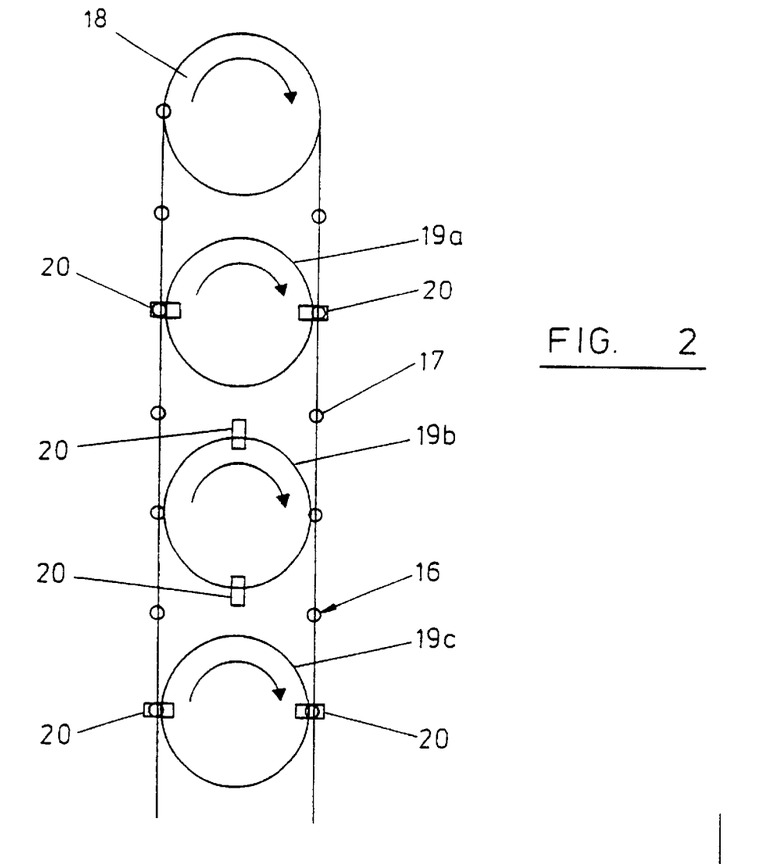
FIG. 2 is a diagrammatic plan view showing one embodiment of the invention.

FIG. 2 is a diagrammatic plan view of an embodiment of the invention in which a chain 16 conveys articles 17 along a conveyor path, which at one point in the processing plant passes around a corner wheel 18.

This embodiment of apparatus according to the invention incorporates a transfer device and in the example shown in FIG. 2, three transfer devices are provided, each comprising a rotatable member 19A, 19B and 19C, each having a pair of handling devices 20 thereon, the handling devices being arranged at opposite sides of the respective rotatable member.

As an article approaches one of the handling devices, the handling device lifts the article clear of its associated article carrier, and the respective rotatable member then rotates through 90°, moving the article into a position where it can be weighed. FIG. 2 shows transfer device 19A about to pick up an article. Transfer device 19B has already picked up an article and moved it into the position for weighing.

After an article has been weighed, the transfer device and associated handling device cooperate to bring the article towards the opposite run of the conveyor chain 16 and then replace the article on an empty article carrier on the opposite run of the conveyor chain 16.

The movement of each transfer device and the associated handling devices is controlled dependent upon the sensing of the positions of empty article carriers which are to receive weighed articles. This means that the apparatus can cope with situations in which the pitch of article carriers along the conveyor path may vary, for example because of wear in the links of the chain, where the conveyor is driven by a chain.

By completely removing the articles from between their adjacent articles, there is no possibility of an article touching adjacent articles while it is being weighed, and so the articles can be spaced more closely together on the conveyor runs than is possible with prior art arrangements.

The arrangements shown in FIG. 2 involves three transfer devices, so that weighing can be carried out at three positions. By weighing at three positions rather than one, more time is made available to carry out each individual weighing operation.

For some applications it may be possible to use two weighing positions or more than three, depending on requirements.

Figure 3:
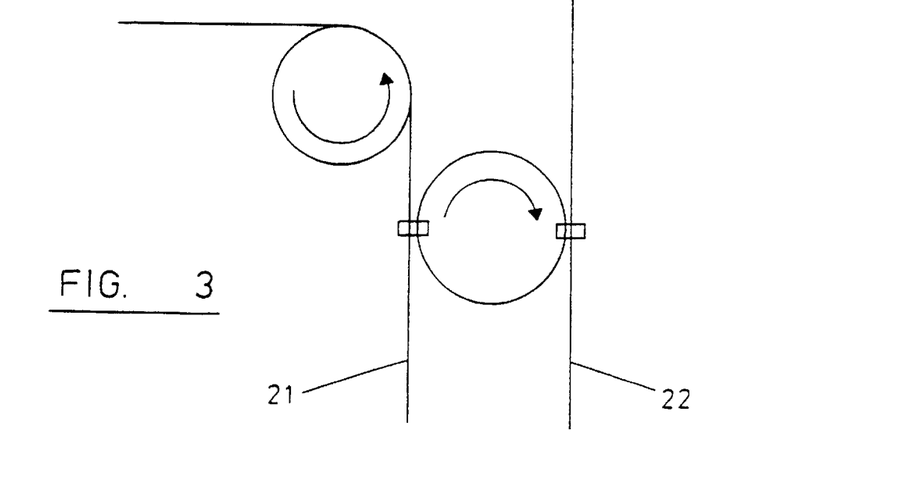
FIG. 3 is a diagrammatic plan view showing a second embodiment of the invention.

It is not essential that the transfer device picks up articles and replaces articles on the same conveyor run. FIG. 3 shows an alternative embodiment in which articles are picked up from one conveyor run 21, weighed, and then replaced on an entirely separate conveyor run 22.

Control means associated with the apparatus counts articles as they are removed from one conveyor run, and checks that each article is replaced on an empty article carrier of the other run, irrespective of any difference in pitch between the two conveyor runs, or difference in speed.

Figure 4:
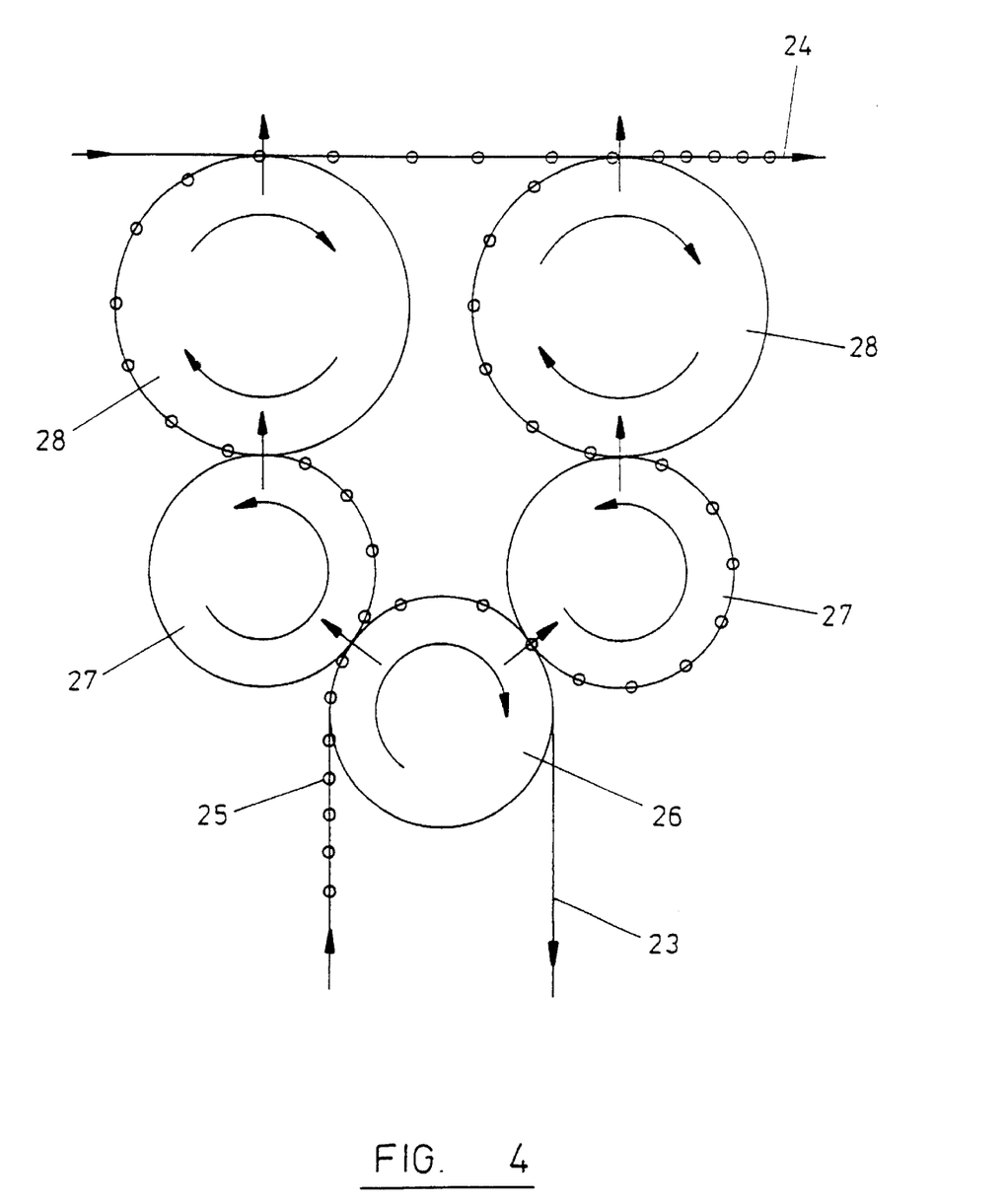
FIG. 4 is a diagrammatic plan view of a further embodiment of the invention.

In FIG. 4 there is shown a first conveyor 23 and a second conveyor 24. The conveyors are arranged to convey a succession of poultry carcasses at a constant linear speed on spaced apart poultry carcass carrying shackles which are illustrated diagrammatically, for example at 25 on conveyor 23.

To facilitate accurate selective removal of carcasses for weighing, conveyor 23 is arranged to travel around a transfer wheel 26 which is rotating in a clockwise direction.

At two points on the bend around the wheel, poultry carcasses are removed by intermediate wheels 27 which in turn transfer the carcasses to two weighing wheels 28.

After the carcasses have been weighed, they are placed on the outgoing conveyor 24 which is moving from left to right as viewed in FIG. 4.

Figure 5:
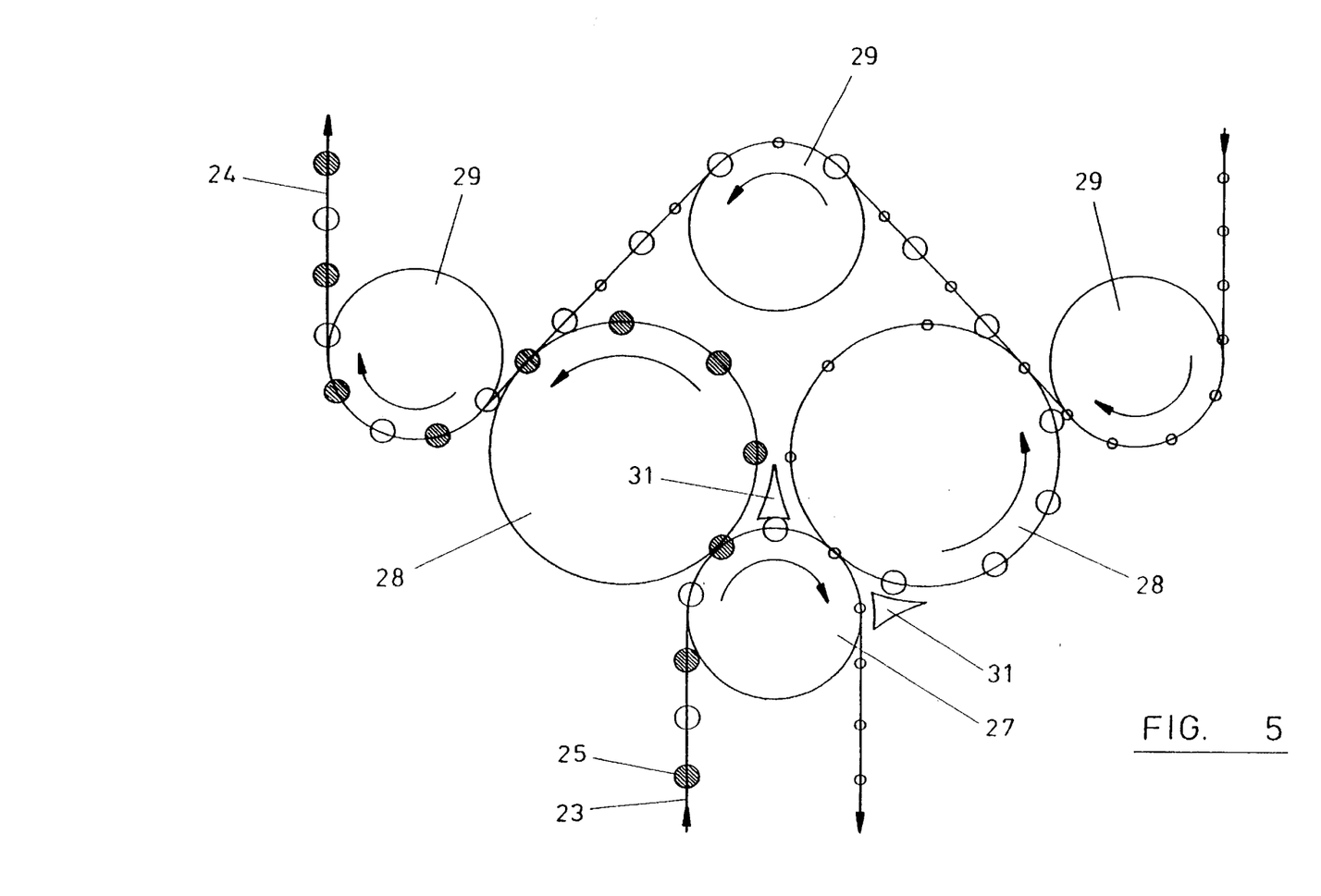
FIG. 5 is a diagrammatic plan view illustrating another embodiment of the invention.

FIG. 5 illustrates an alternative arrangement in which conveyor 23 and transfer wheel 26 remain the same, but the intermediate wheels 27 are eliminated. Transfer takes place directly from the transfer wheel 26 to the two weighing wheels 28.

Carcass control means may be provided, for example in the form of two guide bars 31 are provided, each being positioned in the nip between the transfer wheel 26 and one of the weighing wheels 28. The guide bar serves two purposes. The first purpose is to prevent the bird that is being transferred from pulling either of the adjacent birds out of their carrying shackle, for example if the wings have becomes interlocked. The second purpose is to keep the legs of the transferred bird in the second shackle in case it bounces out of the shackle, or is dragged out by the adjacent bird that had not been transferred.

Although control is less important when transferring carcasses back onto the shackles, since all the shackles are empty and it is not necessary to select specific shackles, control can nevertheless be provided in certain circumstances, for example by arranging for the conveyor 24 to pass around three control wheels 29, one of the control wheels being arranged adjacent to each of the weighing wheels 28.

Figure 6:
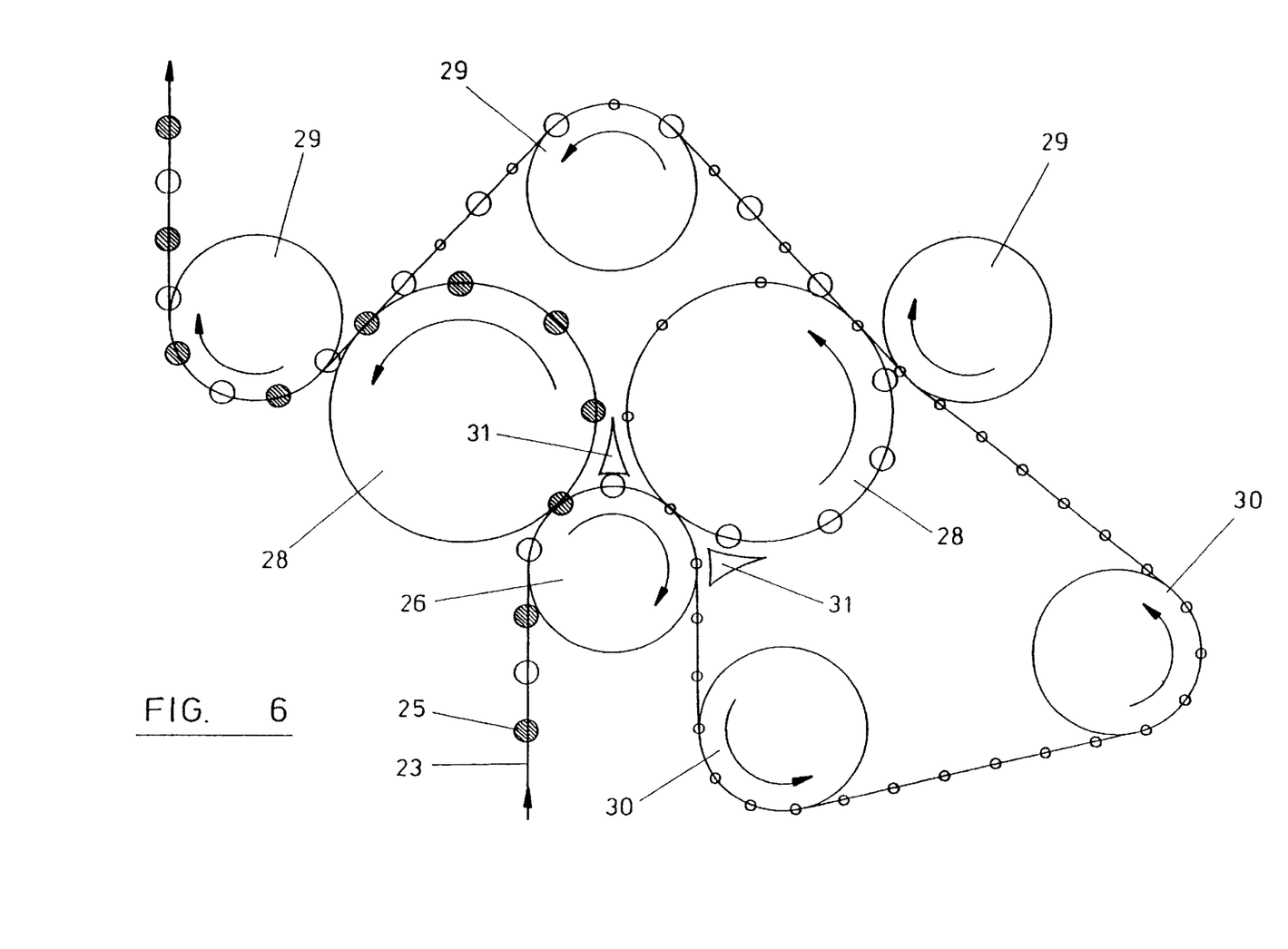
FIG. 6 is a diagrammatic plan view illustrating a still further embodiment.

FIG. 6 illustrates a further arrangement. If there is a requirement for carcasses to be placed back on the same conveyor, after weighing, then the conveyor 23 can be arranged to follow the return path shown, around two corner wheels 30 from when it picks up the two streams of weighed birds, firstly from the right hand weighing wheel 28 and then from the left hand weighing wheel.

Figure 7A:
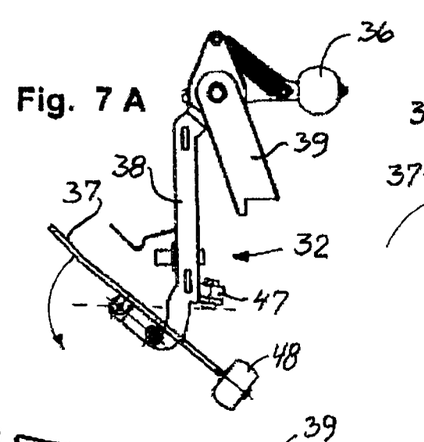
FIG. 7A is a side view of an embodiment for a transfer member with selective tiltable spoon according to the invention shown in an active transfer position.
Figure 7B:
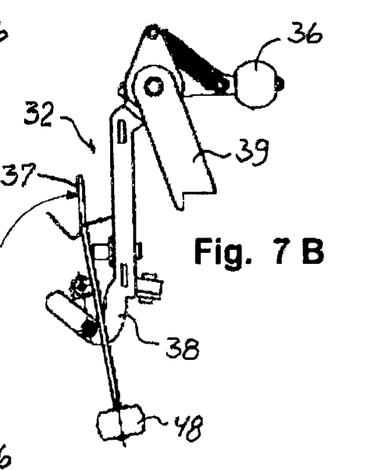
FIG. 7B is a side view of the transfer member shown in FIG. 7A shown with the tiltable spoon in a locked inactive position.
Figure 7C:
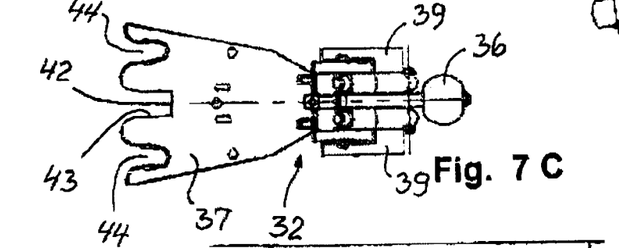
FIG. 7C is a top view of the tiltable spoon shown in FIG. 7A.

A transfer member 32 shown in FIGS. 7A–7C is by means of mounting arms 39 adapted to be secured by means of screws at the circumference of a horizontal transfer wheel 33 (FIGS. 8, 9, 10) also comprising a central cylindrical body 34 provided with a steering path 35 engaging with a steering roller 36 of the transfer member 32.

Figure 8:
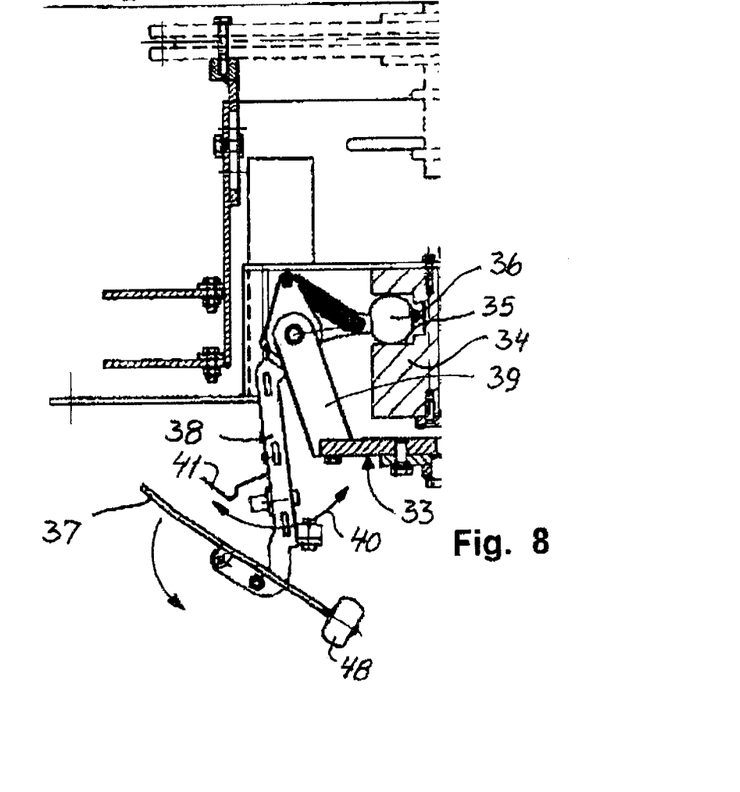
FIG. 8 is a side view partly in section of the transfer member mounted at the circumference of a horizontal transfer wheel.

FIGS. 7A and 8 show the transfer member 32 in an active transfer position, in which a tiltable spoon 37 is free to swing in relation to a J-shaped supporting arm 38, which is pivotably connected to mounting arms 39 secured to the transfer wheel 33 in such a manner that the radially swinging (indicated in FIG. 8 with an arrow 40) of the supporting arm 38 in relation to the central cylindrical body 34 is controlled by said engagement between the steering path 35 and the steering roller 36.

Figure 9:
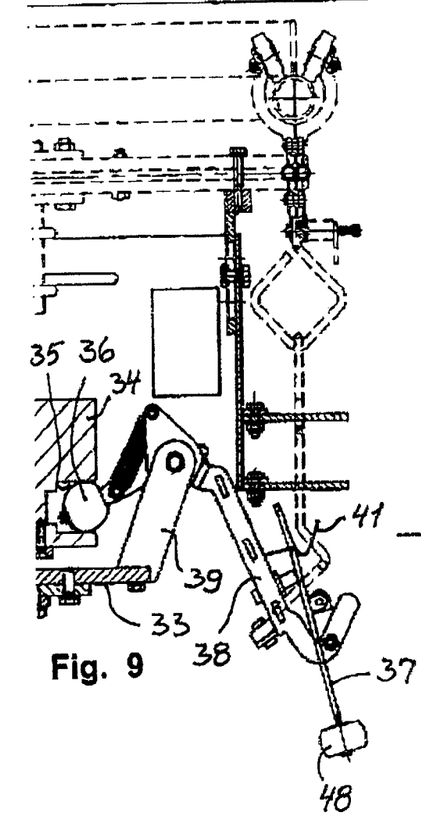
FIG. 9 is a side view partly in section of the transfer member in a locked inactive position at the opposite side of the transfer wheel cf.

FIGS. 7B and 9 show the transfer member 32 in an inactive locked position, in which the tiltable spoon 37 is swung upwards against the supporting arm 38 and locked by means of a locking spring 41 engaging with a transverse wall part 42 of a central incision 43 of the front end of the tiltable spoon 37 (FIG. 7C). The front end of latter being furthermore provided with incisions 44 adapted to receive the legs of a chicken 45 being lifted off from a conveying shackle 46 (FIG. 10) by the radially displacement of the tiltable spoon 37 in the direction away from the transfer wheel 33.

The swinging of the tiltable spoon 37 between the active transfer position (FIG. 7A) and the inactive locked position (FIG. 7A) and vice versa is preferably effected by means of suitable steering bars (not shown).

Figure 10:
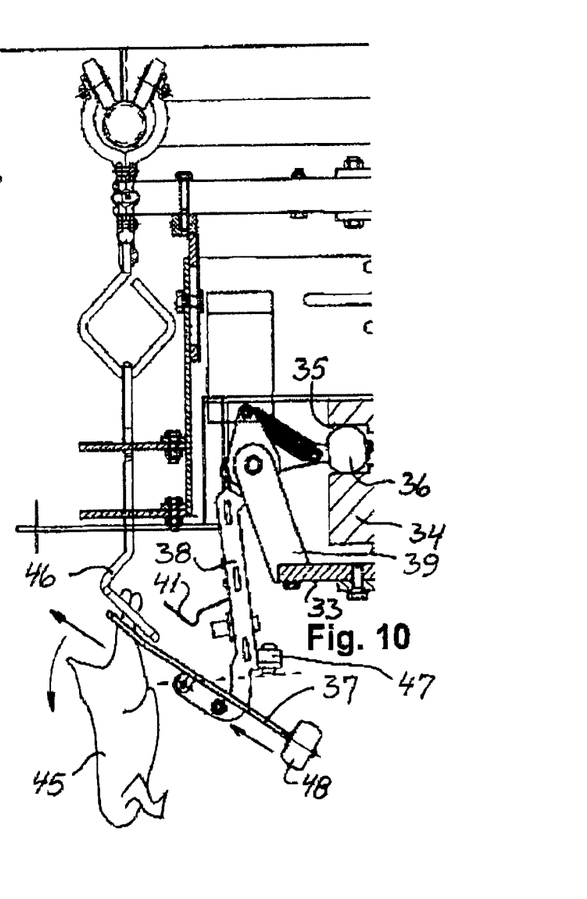
FIG. 10 is a side view partly in section of the transfer member in active transfer position during lifting off a chicken from a conveyor shackle.

When the chicken 45, as shown in FIG. 10, is lifted free from the conveying shackle 46, the weight of the chicken will force the tiltable spoon 37 to be swung to an approximately horizontal position, where the rear end of the spoon, as indicated with dotted line, engages a stop member 47 at the rear side of the supporting arm 38.

It should be mentioned that alone the radial displacement of the tiltable spoon 37, which is effected by the engagement between the steering path 35 and the steering roller 36, would be sufficient to change the mutual distance (the pitch) between two articles (chickens) from 6" to 12" during the weighing operation.

Each transfer member 32 may comprise a weighing unit communicating with a recording unit through a contact rail as said weighing unit may be built-in in the supporting arm 38. Alternatively, a rear end roller 48 of the tiltable spoon 38 may during the rotation of the transfer wheel 33 engage a common weighing rail unit, when the tiltable spoon 37, as already mentioned, by the weight of the chicken is swung to approximately horizontal position.

The apparatus has two more features to cope with deformed or out of gauge shackles. Both features depend on the ability to detect out of gauge shackles. If this situation is detected by sensing means (not shown) it is possible to disengage the transfer mechanism on the transfer corner wheel 27 and the bird separator guide bar 31. The purpose of this is to prevent damage to either of these parts. Secondly, the transfer mechanism is also force sensitive, so that in the event of a jam up, the transfer mechanism will not go through its full stroke.

The embodiments described above are particularly effective in removing selected birds (for example every second or third bird depending on total bird throughput), even out of suspect shackles on the in-feed conveyor (which could be upwards of 1000 meters long, having wound through an air chiller for 30 to 60 minutes) onto the more easily maintained carriers within the transfer and weighing system.

By weighing birds in parallel, there is double the space between successive birds during the weighing cycle. This minimizes the risk that one bird will touch an adjacent bird and it also doubles the time available within which to weigh each bird, while maintaining a constant speed through the cycle.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. Apparatus for processing articles, comprising:
   conveyor means arranged to convey a succession of individual articles from and along a single upstream path to and along at least first and second split downstream paths,
   means to split the succession of articles onto the at least first and second split downstream paths, the split means directing alternate ones of the succession of articles being conveyed on the single upstream path onto respective the at least first and second split downstream paths, the split means including at least two rotatable disk members, each rotatable disk member disposed at a respective one of the at least first and second split downstream paths and operative for lifting a respective one of the individual articles clear of the conveyor means at the single upstream path and for swinging the respective individual article to a respective weighing position along the at least first and second split downstream paths, and
   means to weigh each article at the respective weighing positions while the articles are conveyed along the at least first and second split downstream paths.

2. Apparatus as claimed in claim 1, in which the succession is split using at least one transfer means.

3. Apparatus as claimed in claim 2, in which the transfer means transfers articles from the single upstream path of the conveyor means to at least one of the at least first and second split downstream paths of the conveyor means.

4. Apparatus as claimed in claim 2, in which the transfer means transfers articles from a first conveyor means to a second conveyor means.

5. Apparatus as claimed in claim 4, in which the pitch of the articles being a spacing between adjacent articles, is different on the second conveyor means, compared to the first conveyor means.

6. Apparatus as claimed in claim 2, in which weighing is carried out on the transfer means.

7. Apparatus as claimed in claim 1, in which the transfer means comprises a mechanism operable to release the article from a first article carrier, swing the article into a weighing position, and then swing the article into another position in which it is placed on a second article carrier.

8. Apparatus as claimed in claim 7, in which the article carriers comprise poultry carcass carrying shackles.

9. Apparatus as claimed in claim 1, in which the conveyor means extends around a bend and articles are transferred from the conveyor means on the bend.

10. Apparatus as claimed in claim 9, in which a corner wheel is used to provide the bend.

11. Apparatus as claimed in claim 9, in which the first and second split downstream paths are provided by removing articles from at least two points on the bend.

12. Apparatus as claimed in claim 11, in which there is one transfer wheel around which the conveyor means passes, and at least two weighing wheels.

13. Apparatus as claimed in claim 12, in which there is an intermediate wheel between the transfer wheel and each weighing wheel.

14. Apparatus as claimed in claim 12 in which at least one control wheel is arranged adjacent to at least one weighing wheel to control the articles as they are replaced on the conveyor means.

15. Apparatus as claimed in claim 12, in which control means are provided in the nip between a transfer wheel and a weighing wheel.

16. Apparatus as claimed in claim 15, in which the control means is arranged to prevent an article, including a poultry carcass, which is being transferred, from being pulled away from its receiving carrier by either of the adjacent articles.

17. Apparatus as claimed in claim 15, in which the control means is arranged to either stablise the article being transferred, or lock the article into its receiving carrier or stabilise the article being transferred and lock the article into its receiving carrier.

18. A poultry carcass conveying and weighing apparatus, comprising:

means for conveying a succession of poultry carcasses, the conveyor means including an upstream conveyor portion for conveying an upstream succession of the poultry carcasses along an upstream conveying path, a split conveyor portion connected to the upstream conveyor portion and defining a first split conveying path extending in a first direction and a second split conveying path extending in a second direction different from the first direction, the first split conveying path and the second split conveying path extending downstream from the upstream conveying path;

means for splitting the upstream succession of the poultry carcasses being conveyed along the upstream conveying path into a first split succession of the poultry carcasses for conveyance along the first split conveying path and a second split succession of the poultry carcasses for conveyance along the second split conveying path, the splitting means operative for directing every other one of the poultry carcasses from the upstream succession of the poultry carcasses onto respective first and second split conveying paths of the split conveyor portion, the split means including at least two rotatable disk members, each rotatable disk member disposed at a respective one of the at least first and second split downstream paths and lifting a respective one of the individual poultry carcasses clear of the conveyor means at the single upstream path and then swinging the respective individual poultry carcass to a respective weighing position along the at least first and second split downstream paths; and means for weighing each poultry carcass along both the first and second split conveying paths at the respective weighing positions.

19. A poultry carcass conveying and weighing apparatus according to claim 18, wherein the conveyor means includes a downstream conveyor portion connected to the split conveyor portion and defining a downstream conveying path extending downstream from the first and second split conveying paths.

20. A poultry carcass conveying and weighing apparatus according to claim 19, further comprising means for joining the first split succession of the poultry carcasses and the second split succession of the poultry carcasses into a single downstream succession of weighed poultry carcasses, the joining means disposed adjacent the downstream conveyor portion so that the single downstream succession of the weighed poultry carcasses is conveyed downstream along the downstream conveying path.

* * * * *

UNITED STATES PATENT AND TRADEMARK OFFICE
CERTIFICATE OF CORRECTION

PATENT NO. : 6,689,963 B2
DATED : February 10, 2004
INVENTOR(S) : Brook

It is certified that error appears in the above-identified patent and that said Letters Patent is hereby corrected as shown below:

<u>Title page, Item [54] and Column 1, line 1,</u>
Title, please change to read as follows:
-- APPARATUS AND METHOD FOR PROCESSING ARTICLES --.

Signed and Sealed this

Sixth Day of September, 2005

JON W. DUDAS
*Director of the United States Patent and Trademark Office*